United States Patent
Said et al.

(10) Patent No.: US 9,772,128 B2
(45) Date of Patent: Sep. 26, 2017

(54) SOLAR POWERED INTERMITTENT OPERATION BASED CONTINUOUS ABSORPTION SYSTEM

(71) Applicant: King Fahd University of Petroleum and Minerals, Dhahran (SA)

(72) Inventors: Syed Ahmed Mohammad Said, Dhahran (SA); Muhammad Umar Siddiqui, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 821 days.

(21) Appl. No.: 14/244,424

(22) Filed: Apr. 3, 2014

(65) Prior Publication Data

US 2015/0285543 A1    Oct. 8, 2015

(51) Int. Cl.
  *F25B 27/00*    (2006.01)
  *F25B 17/04*    (2006.01)

(52) U.S. Cl.
  CPC ............ *F25B 27/007* (2013.01); *F25B 17/04* (2013.01); *Y02B 30/62* (2013.01)

(58) Field of Classification Search
  CPC ........ F25B 17/02; F25B 17/04; F25B 27/007; F25B 35/00; F25B 35/02; F25B 15/06; F25B 2400/24; F25B 25/005; Y02B 30/62
  See application file for complete search history.

(56) References Cited

U.S. PATENT DOCUMENTS

| | | | | |
|---|---|---|---|---|
| 4,273,184 A | * | 6/1981 | Tanaka | F24D 11/0221 126/615 |
| 4,439,994 A | | 4/1984 | Briley | |
| 4,470,269 A | * | 9/1984 | Takemi | F25B 15/02 62/235.1 |
| 5,666,818 A | * | 9/1997 | Manrique-Valadez | F25B 27/007 62/235.1 |
| 5,946,937 A | * | 9/1999 | Kujak | C09K 5/047 62/101 |
| 6,000,211 A | * | 12/1999 | Bellac | F01K 21/047 60/39.182 |
| 8,720,216 B1 | * | 5/2014 | Said | F25B 15/06 62/113 |

(Continued)

FOREIGN PATENT DOCUMENTS

| | | |
|---|---|---|
| CN | 101196351 A | 6/2008 |
| CN | 103075836 A | 5/2013 |
| GB | 184491 | 11/1923 |

*Primary Examiner* — Elizabeth Martin
*Assistant Examiner* — Zachary R Anderegg
(74) *Attorney, Agent, or Firm* — Oblon, McClelland, Maier & Neustadt, L.L.P.

(57) ABSTRACT

An intermittent operation based continuous absorption system (IOBCAS) which supports cooling effect during the daytime without the use of a solution pump is provided. The IOBCAS may utilize an isochoric process for pressurization of the system and the system may include a plurality of generator-absorber units that intermittently operate in succession to provide a continuous refrigeration cooling effect during the daytime. The system of the present disclosure enables the plurality of generator-absorber units to switch between a generation, absorption, and heat recovery mode of operation to provide cooling effect during the daytime which a higher coefficient of performance compared with conventional intermittent system.

11 Claims, 1 Drawing Sheet

(56) References Cited

U.S. PATENT DOCUMENTS

| 9,702,597 B1* | 7/2017 | El-Shaarawi | F25B 27/007 |
| 2011/0167854 A1* | 7/2011 | Edwards | F24F 3/1417 |
| | | | 62/235.1 |
| 2011/0226447 A1* | 9/2011 | Mieda | F28D 7/022 |
| | | | 165/104.12 |

* cited by examiner

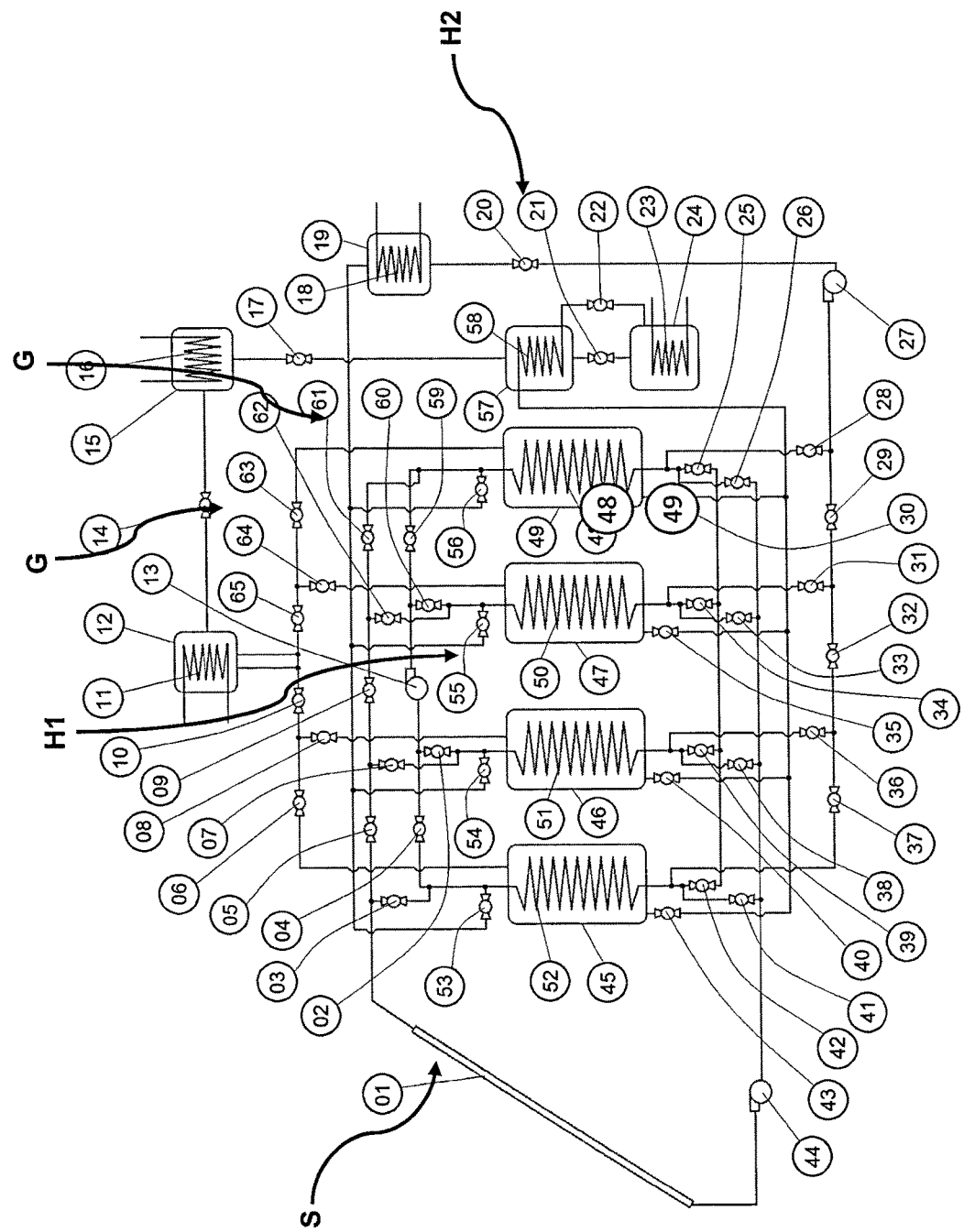

SOLAR POWERED INTERMITTENT OPERATION BASED CONTINUOUS ABSORPTION SYSTEM

BACKGROUND

The present disclosure relates to a solar powered intermittent operation based continuous absorption system to provide a refrigeration or cooling effect without the use of a solution pump. The air-conditioning and refrigeration sector consumes a lot of electrical energy produced, particular in hot climate regions. The coincidence of maximum cooling loads with the period of the highest solar irradiance makes solar energy a potential candidate for powering refrigeration and air conditioning systems and hence conserves a significant portion of electrical energy to be used in the production sector. In this regard, absorption air-conditioning and refrigeration systems (chillers) may have the potential to directly use solar energy.

Absorption chillers in the related art are basically classified into two main categories, intermittent operation systems and continuous operation systems. The basic difference between intermittent operation systems and continuous operation systems is their respective mode of operation. In intermittent operation systems, generation and absorption do not take place at the same time. Instead they intermittently follow each other within the operation of the system. In contrast, continuous operation systems have both generation and absorption take place at the same time in a continuous manner. Continuous absorption systems are comparatively much more developed than intermittent operation systems.

Another basic difference between these two systems is that continuous operation systems require a solution pump to pressurize the system, whereas intermittent operation systems uses isochoric process to pressurize the system. The reactive nature of ammonia solution requires that the solution pump in the continuous operation systems to be made of stainless steel. The stainless steel solution pump with high pressurization requirements makes the pump a very expensive component of continuous absorption systems. On the other hand, the intermittent operation systems do not require a solution pump since it uses an isochoric process for pressurization.

However, there are certain limitations of intermittent operation systems in the related art compared with the continuous operation systems in the related art. First, the intermittent absorption systems have low coefficient of performance compared with the continuous absorption systems. The low coefficient of performance is due to an inability of the intermittent operation systems to undergo a heat recovery process because the systems lack hot and cold solutions at the same time.

Second, the intermittent operation systems cannot produce refrigeration effect during the daytime when use of such systems is highly desired. This is due to the fact that refrigeration effect can only be produced during the absorption process, which takes place only at night time in the conventional intermittent operation systems. Third, the intermittent operation systems are set up such that they have a cycle time of approximately 24 hours which causes the systems' mass to increase considerably, for a specific cooling load requirement, thereby making the systems' mass much bulkier compared with continuous operation systems.

An object of the present disclosure is to provide an intermittent operation based continuous system that overcomes the above-mentioned problems and limitations of continuous operation systems and intermittent operation systems in the related art.

BRIEF SUMMARY OF THE INVENTION

An intermittent operation based continuous absorption system (IOBCAS) may provide continuous cooling effect, including during the daytime, without the use of a solution pump. Instead, the IOBCAS may operate using an isochoric process to pressurize the system.

According to one embodiment of the present disclosure, the IOBCAS may include a plurality of generator-absorber units. The plurality of generator-absorber units may be intermittently operated in succession to enable the system to provide a continuous refrigeration or cooling effect, including during the daytime. In one embodiment, the plurality of generator-absorber units may include at least four generator-absorber units to intermittently operate in succession. Each of the generator-absorber units may be operated and cycled through different modes of operation, which may include a generation mode, an absorption mode, and a heat recovery mode.

In one embodiment, the IOBCAS may include an arrangement of valves in order for the plurality of generator-absorber units to switch between the different modes of operation. Each of the generator-absorber units may include a heat exchanger inside a shell. The IOBCAS may include a dephlegmator, a condenser, a vapor-liquid heat recovery unit, a heat rejection unit, and an evaporator.

In one embodiment, the IOBCAS may be solar powered and include at least one solar collector, a first pump for regulating flow through the solar collector, a second pump for regulating flow through the heat rejection unit, and a third pump for regulating flow between generator-absorber units for heat recovery between the generator-absorber units.

The above IOBCAS, which will be described in more detail herein below, provides a system which may have a high coefficient of performance, may provide a cooling effect during the daytime, and may have comparatively less system mass than refrigeration systems in the related art.

DESCRIPTION OF THE DRAWINGS

The characteristics and advantages of exemplary embodiments are set out in more detail in the following description, made with reference to the accompanying drawing.

FIG. 1 depicts an exemplary schematic diagram of an intermittent operation based continuous absorption system.

DETAILED DESCRIPTION OF THE INVENTION

Objects, advantages, and features of the exemplary Intermittent Operation Based Continuous Absorption System (IOBCAS) described herein will be apparent to one skilled in the art from a consideration of this specification, including the attached drawings.

According to one embodiment of the present disclosure, the IOBCAS may include a plurality of generator-absorber units. The plurality of generator-absorber units may be intermittently operated in succession to enable the system to provide a continuous refrigeration or cooling effect, including during and throughout daytime hours when the sun is present. Each of the generator-absorber units may be operated and cycled through different modes of operation, which may include a generation mode, an absorption mode, and a heat recovery mode.

In one embodiment, as shown in FIG. 1, the IOBCAS may comprise four generator-absorber units 45, 46, 47, 48 to intermittently operate in succession. The four generator-absorber units 45, 46, 47, 48 may each include a shell which houses heat exchangers 52, 51, 50, 49, respectively. The shell of each of the respective four generator-absorber units 45, 46, 47, 48 may receive and/or retain a coolant during the different stages of operations. The heat exchangers 52, 51, 50, 49 of the respective the four generator-absorber units 45, 46, 47, 48 may receive, transfer, and/or retain cooling water during the different stages of operations. The heat exchangers 52, 51, 50, 49 may transfer heat between the cooling water and the coolant of the four generator-absorber units 45, 46, 47, 48. In one embodiment, the coolant may be may be an aqua-ammonia solution.

The IOBCAS may include a heat recovery circuit H1, a heat rejection circuit H2, a generation circuit G, and a solar collector circuit S. The IOBCAS may comprise a dephlegmator 12, a condenser 15, a vapor-liquid heat recovery unit 57, a heat rejection unit 19, and an evaporator 24. The dephlegmator 12 may include a heat exchanger 11 which may be filled with cooling water. The condenser 15 may include a heat exchanger 16 which may be filled with cooling water. The heat rejection unit 19 may include a heat exchanger 18 which may be filled cooling water. The evaporator 24 may include a heat exchanger 23 which may be filled with chilled cooling water to provide a refrigeration or cooling effect to a cooling load. The vapor-liquid heat recovery unit 57 may include a heat exchanger 58 for sub-cooling a coolant by heat recovery by passing it through a throttling valve 21 before the coolant enters into the evaporator 24. In one embodiment, the coolant may be an aqua-ammonia solution.

In one embodiment, the heat exchanger 11 of the dephlegmator 12, the heat exchanger 16 of the condenser 15, and the heat exchanger 18 of the heat rejection unit 19 may each reject heat via cooling water to the ambient environment. In one embodiment, heat rejection performed by the heat exchanger 11, the heat exchanger 16, and/or the heat exchanger 18 may be accomplished via air cooling.

In one embodiment, the heat recovery circuit H1 may include a pump 13 and valves 02, 04, 25, 34, 39, 42, 59, 60. The valves 02, 04, 25, 34, 39, 42, 59, 60 may be used to control an inlet and/or an outlet of cooling water flow in one or more of the four generator-absorber units 45, 46, 47, 48 to connect with the heat recovery circuit H1 during the different stages of operation. In one embodiment, the heat rejection circuit H2 may include a pump 27, valves 20, 28, 29, 31, 32, 36, 37, 53, 54, 55, 56, and the heat rejection unit 19. The valves 20, 28, 29, 31, 32, 36, 37, 53, 54, 55, 56 may be used to control an inlet and/or an outlet of cooling water flow in one or more of the four generator-absorber units 45, 46, 47, 48 to connect with the heat rejection circuit H2 during the different stages of operation. In one embodiment, the generation circuit G may include valves 6, 8, 10, 14, 17, 22, 30, 35, 40, 43, 63, 64, 65, the dephlegmator 12, the condenser 15, throttle valve 21, the evaporator 24, and the vapor-liquid heat recovery unit 57. The valves 6, 8, 10, 14, 17, 22, 30, 35, 40, 43, 63, 64, 65 may be used to control an inlet and/or an outlet of coolant in one or more of the four generator-absorber units 45, 46, 47, 48 with the generation circuit G during the different stages of operation.

In one embodiment the IOBCAS may be simplified by omitting the heat recovery circuit H1 or operated without the heat recovery circuit H1. However, the coefficient of performance of the IOBCAS would be reduced by approximately 20 to 30 percent without the use of the heat recover circuit H1.

In one embodiment, solar collector circuit S may include a solar collector 01 to utilize solar thermal energy from sunlight during daytime to operate and provide energy for the IOBCAS. The solar collector circuit S may further include a pump 44, and valves 03, 05, 07, 09, 26, 33, 38, 41, 61, 62. The valves 03, 05, 07, 09, 26, 33, 38, 41, 61, 62 may be used to control an inlet and/or an outlet of cooling water flow in one or more of the four generator-absorber units 45, 46, 47, 48 with the solar collector circuit S during the different stages of operation.

In one embodiment, the pump 44 may be provided to regulate flow of cooling water that passes through the solar collector 01. A second pump 27 may be provided to regulate flow of cooling water that passes through the heat rejection circuit H2. A third pump 13 may be provided to regulate flow of cooling water for heat recovery between the generator-absorber units 45, 46, 47, 48, as will be described in detail below. All three pumps 13, 27, 44 may be in the form of regular water pumps that are cost effective and readily available on the market, compared with solution pumps that are required for continuous operation systems.

In one embodiment, the IOBCAS may comprise four generator-absorber units: a first generator-absorber unit 45, a second generator-absorber unit 46, a third generator-absorber unit 47, and a fourth generator-absorber unit 48. The four generator-absorber units 45, 46, 47, 48 may undergo six modes of operation in one complete cycle of the IOBCAS. The six modes of operation may include partial pressurization, complete pressurization, generation, partial depressurization, complete depressurization, and absorption. In one embodiment, the six modes of operation may be performed in four stages of operation of the IOBCAS. The IOBCAS may progress and switch among the four stages of operation via the use of valves that interconnect the generator-absorber units 45, 46, 47, 48 and other components of the IOBCAS.

An exemplary embodiment of a method of operating the IOBCAS through the four stages of operation will now be described. In one embodiment, the IOBCAS may be operated to produce a refrigeration effect of between −3 to −7° C. at an ambient temperature of between 25 to 45° C. when the solar collector 01 is operated between 90 to 160° C. In one embodiment, the IOBCAS may be operated to produce a refrigeration effect of −5° C. at an ambient temperature of 40° C. when the solar collector 01 is operated at 120° C. In one embodiment, the IOBCAS may be operated using an aqua-ammonia solution with the above IOBCAS temperature parameters.

One advantage of operating the IOBCAS with the above temperature parameter is that the system may produce ice such that refrigeration temperature may be below 0° C., but not too low where the coefficient of performance of the IOBCAS would be significantly reduced. The high ambient temperature of 25 to 45° C. may provide a reasonable operating range for ice production. Additionally, a temperature range of 90 to 160° C. may easily be reached using present solar collector technology when ambient temperature range is around 40° C.

First Stage of Operation

In the first stage of operation, the first generator-absorber unit 45 may go through the partial pressurization mode of operation where the first generator-absorber unit 45 may increase in pressure (where a pressure increase or decrease of the generator-absorber units 45, 46, 47, 48 refers to a pressure increase or decrease of the coolant within a respective generator-absorber unit). In one embodiment, the pressure of the first generator-absorber unit 45 may increase from 3.5 bar to 5.7 bar. The partial pressurization process of the first generator-absorber unit 45 may take place by heat recovery through the partial depressurization of the third generator-absorber unit 47.

During partial depressurization of the third generator-absorber unit 47, the third generator-absorber unit 47 may decrease in pressure. In one embodiment, the pressure of the third generator-absorber unit 47 may decrease from 15.5 bar to 9.8 bar. Hence, the third generator-absorber unit 47 may go through the partial depressurization mode of operation while the first generator-absorber unit 45 undergoes the partial pressurization mode of operation. The heat recovery circuit H1 between the first generator-absorber unit 45 and the third generator-absorber unit 47 during the first stage of operation may be connected via pump 13 by keeping valves 04, 60, 42, 34 of the heat recovery circuit H1 open, while keeping valves 02, 59, 39, 25 of the heat recovery circuit H1 closed. The heat recovery circuit H1 may be filled with water, which may take heat from the third generator-absorber unit 47 and supply the heat to the first generator-absorber unit 45.

The pump 13 may cause the water to circulate inside the heat recovery circuit H1. The water may be pumped through valve 60, take in the heat from the heat exchanger 50 of the third generator-absorber unit 47, flow through the valves 34, 42, and supply the heat to the heat exchanger 52 of the first generator-absorber unit 45. The water may then flow through the valve 04 and return back to the pump 13, thus completing the heat recovery circuit H1.

The partial pressurization process results in a temperature rise in the first generator-absorber unit 45 and the partial depressurization process results in a temperature drop in the third generator-absorber unit 47 (where a temperature rise or drop of the generator-absorber units 45, 46, 47, 48 refers to a temperature rise or drop of the coolant within a respective generator-absorber unit). In one embodiment, the temperature of the first generator-absorber unit 45 may rise from 40° C. to 75° C., while the temperature of the third generator-absorber unit 47 may drop from 120° C. to 77° C., assuming a minimum temperature difference of 2° C. for the actual heat recovery process between the first generator-absorber unit 45 and third generator-absorber unit 47.

In the first stage of operation, the second generator-absorber unit 46 may initially go through the complete pressurization mode of operation, which may be followed by the generation mode of operation in the same stage of operation. In one embodiment, the pressure of the second generator-absorber unit 46 may increase from 5.7 bar to 15.5 bar. During the complete pressurization mode, the temperature of strong solution in the second generator-absorber unit 46 may rise from 75° C. to 95° C., whereas in the generation mode of operation the aqua-ammonia solution temperature may rise from 95° C. to 120° C., while the ammonia mass concentration of the aqua-ammonia solution reduces from 0.43 to 0.32.

The energy required for both the complete pressurization and the generation modes of operation may be supplied by the solar collector 01. The solar collector circuit S may be connected to the pump 44 by keeping valves 05, 07, 38 of the solar collector circuit S open, while keeping the valves 03, 09, 61, 62, 41, 33, 26 of the solar collector circuit S closed. Water inside the solar collector circuit S may be pumped to the solar collector 01 where it receives solar thermal energy, moved through valve 05, then through valve 07, and the solar thermal energy may be supplied to the heat exchanger 51 of the second generator-absorber unit 46. The water may then be supplied through valve 38 to return back to the pump 44, thus completing the solar collector circuit S.

As a result of solar energy input, the second generator-absorber unit 46 may initially undergo complete pressurization in the complete pressurization mode of operation where the valves 06, 08, 10, 63, 64, 65, 14, 17 of the generation circuit G may be kept closed. Once pressurization in the complete pressurization mode is completed, the second generator-absorber unit 46 may enter into the generation mode of operation. During the generation mode, aqua-ammonia vapors may be generated and the valves 08, 10 may be opened to connect the second generator-absorber unit 46 to the dephlegmator 12 where rectification of the generated aqua-ammonia vapors may take place, thereby removing water content from the aqua-ammonia vapors by heat rejection through heat exchanger 11 of the dephlegmator 12. The condensate from the dephlegmator 12 may return back following the same path through the valves 08, 10 to the second generator-absorber unit 46.

The valves 14, 17 of the generation circuit G may also be opened to connect the dephlegmator 12 to the condenser 15 and the vapor-liquid heat exchanger unit 57. The rectified ammonia vapors may condense inside the condenser 15. In one embodiment, the rectified ammonia vapors may condense at a temperature of 40° C. and a pressure of 15.5 bar by rejecting heat to the heat exchanger 16 of the condenser 15 and then enter into the vapor-liquid heat exchanger unit 57 where the ammonia is stored and sub-cooled by the heat exchanger 58.

In the first stage of operation, the fourth generator-absorber unit 48 may initially go through the complete depressurization mode of operation, which may be followed by the absorption mode of operation in the same stage of operation. In one embodiment, the pressure of the fourth generator-absorber unit 48 may decrease from 9.8 bar to 3.5 bar. During the complete depressurization mode, the temperature of the weak solution in the fourth generator-absorber unit 48 may drop from 77° C. to 61.5° C., whereas in the absorption mode of operation the aqua-ammonia solution temperature may drop from 61.5° C. to 40° C., while the ammonia mass concentration of the aqua-ammonia solution may increase from 0.32 to 0.43.

The energy required to be removed for both the complete depressurization and the absorption modes of operation may be rejected by the heat rejection unit 19. The heat rejection circuit H2 may be connected to the pump 27 by keeping valves 20, 28, 56 of the heat rejection circuit H2 open while keeping the valves 29, 31, 32, 36, 37, 53, 54, 55 of the heat rejection circuit H2 closed. Water inside the heat rejection circuit H2 may be pumped through valve 28 to the heat exchanger 49 of the fourth generator-absorber unit 48 where the water gains heat that is required to be removed. The water may then move through valve 56 to the heat rejection unit 19 where it rejects heat to the cooling water in the heat exchanger 18, moves through the valve 20 and returns back to the pump 27, thus completing the heat rejection circuit H2.

As a result of heat rejection, the fourth generator-absorber unit 48 may initially undergo complete depressurization in the complete depressurization mode of operation where the throttling valve 21 and the valves 43, 40, 35, 30, 22 of the generation circuit G may be kept closed. Once depressurization in the depressurization mode is completed, the fourth generator-absorber unit 48 may enter into the absorption mode of operation. During the absorption mode of operation, the throttling valve 21 and valve 22 may be opened, the sub-cooled refrigerant ammonia may be throttled by the throttling valve 21 to be converted into a vapor-liquid mixture which may then enter into the evaporator 24. The heat exchanger 23 inside the evaporator 24 may take in the latent heat of vaporization from the liquid portion of the refrigerant ammonia to provide the required cooling effect. In one embodiment, the cooling effect may be provided at a temperature of −5° C. and a pressure of 3.5 bar.

The saturated ammonia vapor formed due to the evaporation process may move out of the evaporator 24 through valve 22 to enter into the heat exchanger 58 of the vapor-liquid heat exchanger unit 57. The saturated vapor may become superheated by gaining the heat while sub-cooling the liquid refrigerant ammonia inside the vapor-liquid heat exchanger unit 57. The superheated ammonia vapor thus produced may move inside the fourth generator-absorber unit 48 to get absorbed by the weak aqua-ammonia solution inside it, thereby producing strong aqua-ammonia solution. In order for the absorption process to take place inside the fourth generator-absorber unit 48, the valve 30 may now be kept open while the valves 43, 40, 35 may still be kept closed.

Second Stage of Operation

In the second stage of operation, the fourth generator-absorber unit 48 may go through the partial pressurization mode of operation where the fourth generator-absorber unit 48 may increase in pressure. In one embodiment, the pressure of the fourth generator-absorber unit 48 may increase from 3.5 bar to 5.7 bar. The partial pressurization process may take place by heat recovery through the partial depressurization of the second generator-absorber unit 46.

During partial depressurization of the second generator-absorber unit 46, the second generator-absorber unit 46 may decrease in pressure. In one embodiment, the second generator-absorber unit 46 may decrease from 15.5 bar to 9.8 bar. Hence, the second generator-absorber unit 46 may go through the partial depressurization mode of operation while the fourth generator-absorber unit 48 undergoes the partial pressurization mode of operation. The heat recovery circuit H1 between the fourth generator-absorber unit 48 and the second generator-absorber unit 46 during the second stage of operation may be connected to the pump 13 by keeping valves 02, 59, 39, 25 of the heat recovery circuit open, while keeping the valves 04, 60, 42, 34 of the heat recovery circuit closed. The heat recovery circuit H1 may be filled with water, which may take heat from the second generator-absorber unit 46 and supply the heat to the fourth generator-absorber unit 48.

The pump 13 may cause the water to circulate inside the heat recovery circuit H1. The water may be pumped through valve 39, take in the heat from the heat exchanger 51 of the second generator-absorber unit 46, flow through valves 59, 25, and supply the heat to the heat exchanger 49 of the fourth generator-absorber unit 48. The water may then flow through the valve 02 and return back into the pump 13, thus completing the heat recovery circuit H1.

The partial pressurization process results in a temperature rise in the fourth generator-absorber unit 48 and the partial depressurization process results in a temperature drop in the second generator-absorber unit 46. In one embodiment, the temperature of the fourth generator-absorber unit 48 may rise from 40° C. to 75° C., while the temperature of the second generator-absorber unit 46 may drop from 120° C. to 77° C., assuming a minimum temperature difference of 2° C. for the actual heat recovery process between the fourth generator-absorber unit 48 and second generator-absorber units 46.

In the second stage of operation, the first generator-absorber unit 45 may initially go through complete pressurization mode of operation, which may be followed by the generation mode of operation in the same stage of operation. In one embodiment, the pressure of the first generator-absorber unit 45 may increase from 5.7 bar to 15.5 bar. During the complete pressurization mode, the temperature of the strong solution in the first generator-absorber unit 45 may rise from 75° C. to 95° C., whereas in the generation mode of operation the aqua-ammonia solution temperature may rise from 95° C. to 120° C., while the ammonia mass concentration of the aqua-ammonia solution may reduce from 0.43 to 0.32.

The energy required for both complete pressurization and generation modes of operation may be supplied by the solar collector 01. The solar collector circuit S may be connected to the pump 44 by keeping valves 03, 41 of the solar collector circuit S open, while keeping the valves 05, 07, 09, 61, 62, 38, 33, 26 of the solar collector circuit S closed. Water inside the solar collector circuit S may be pumped to the solar collector 01 where the water may receive solar thermal energy, moved through valve 03, and the solar thermal energy may be supplied to the heat exchanger 52 of the first generator-absorber unit 45. The water may then be moved through valve 41 to return back into the pump 44, thus completing the solar collector circuit S.

As a result of solar energy input, the first generator-absorber unit 45 may initially undergo complete pressurization in the complete pressurization mode of operation during where the valves 06, 08, 10, 63, 64, 65, 14, 17 of the generation circuit G may be kept closed. Once pressurization in the complete pressurization mode is completed, the first generator-absorber unit 45 may enter into the generation mode of operation. During the generation mode of operation, the aqua-ammonia vapors may be generated so the valves 06, 10 may be opened to connect the first generator-absorber unit 45 to the dephlegmator 12 where the rectification of the generated aqua-ammonia vapors may take place, thereby removing the water content from the aqua-ammonia vapors by heat rejection through heat exchanger 11 of the dephlegmator 12. The condensate from the dephlegmator 12 may return back following the same path through valve 06, 10 to the first generator-absorber unit 45.

The valves 14, 17 of the generation circuit G may also be opened to connect the dephlegmator 12 to the condenser 15 and the vapor-liquid heat exchanger unit 57. The rectified ammonia vapors may condense inside the condenser 15. In one embodiment, the rectified ammonia vapors may condense at a temperature 40° C. and a pressure of 15.5 bar by rejecting heat to the heat exchanger 16 of the condenser 15 and then enter into the vapor-liquid heat exchanger unit 57 where the ammonia is stored and sub-cooled by the heat exchanger 58.

In the second stage of operation, the third generator-absorber unit 47 may initially go through the complete depressurization mode of operation, which may be followed by the absorption mode of operation in the same stage of operation. In one embodiment, the pressure of the third generator-absorber unit 47 may decrease from 9.8 bar to 3.5 bar. During the complete depressurization mode, the temperature of the weak solution in the third generator-absorber unit 47 may drop from 77° C. to 61.5° C., whereas in the absorption mode of operation the aqua-ammonia solution temperature may drop from 61.5° C. to 40° C., while the ammonia mass concentration of the aqua-ammonia solution may increase from 0.32 to 0.43.

The energy required to be removed for both the complete depressurization and the absorption modes of operation may be rejected by the heat rejection unit 19. The heat rejection circuit H2 may be connected to the pump 27 by keeping valves 20, 29, 31, 55 of the heat rejection circuit H2 open, while keeping the valves 28, 32, 36, 37, 53, 54, 56 of the heat rejection circuit H2 closed. Water inside the heat rejection circuit H2 is pumped through the valves 29, 31 into the heat exchanger 50 of the third generator-absorber unit 47 where the water gains heat that is required to be removed. The water may then move through valve 55 to the heat rejection unit 19 where it rejects heat to the cooling water in the heat exchanger 18, moves through the valve 20 and return back to the pump 27, thus completing the heat rejection circuit H2.

As a result of heat rejection, the third generator-absorber unit 47 may initially undergo complete depressurization mode in the complete depressurization mode of operation where the throttling valve 21 and the valves 43, 40, 35, 30, 22 of the generation circuit G may be kept closed. Once depressurization in the depressurization mode is completed, the third generator-absorber unit 47 may enter into the absorption mode of operation. During the absorption mode of operation, the throttling valve 21 and valve 22 may be opened, the sub-cooled refrigerant ammonia may be throttled by the throttling valve 21 to be converted into a vapor-liquid mixture which may then enter into the evaporator 24. The heat exchanger 23 inside the evaporator 24 may take in the latent heat of vaporization from the liquid portion of the refrigerant ammonia to provide the required cooling effect. In one embodiment, the cooling effect may be provided at a temperature of −5° C. and a pressure of 3.5 bar.

The saturated ammonia vapor formed due to the evaporation process may move out of the evaporator 24 through valve 22 to enter into the heat exchanger 58 of the vapor-liquid heat exchanger unit 57. The saturated vapor may become superheated by gaining the heat while sub-cooling the liquid refrigerant ammonia inside the vapor-liquid heat exchanger unit 57. The superheated ammonia vapor thus produced may move inside the third generator-absorber unit 47 to get absorbed inside the weak aqua-ammonia solution inside it, thereby producing strong aqua-ammonia solution. In order for absorption process to take place inside the third generator-absorber unit 47, the valve 35 may now kept open while the valves 43, 40, 30 may still be kept closed.

Third Stage of Operation

In the third stage of operation, the third generator-absorber unit 47 may go through the partial pressurization mode of operation where the third generator-absorber unit 47 increases in pressure. In one embodiment, the pressure of the third generator-absorber unit 47 may increase from 3.5 bar to 5.7 bar. The partial pressurization process of the third generator-absorber unit 47 may take place by heat recovery through the partial depressurization of the first generator-absorber unit 45.

During partial depressurization of the first generator-absorber unit 45, the first generator-absorber unit 45 decreases in pressure. In one embodiment, the first generator-absorber unit 45 may decrease from 15.5 bar to 9.8 bar. Hence, the first generator-absorber unit 45 may go through the partial depressurization mode of operation while the third generator-absorber unit 47 undergoes the partial pressurization mode of operation. The heat recovery circuit H1 between the third generator-absorber unit 47 and the first generator-absorber unit 45 during the third stage of operation may be connected via pump 13 by keeping valves 04, 60, 42, 34 of the recovery circuit open, while keeping the valves 02, 59, 39, 25 of the recovery circuit closed. The heat recovery circuit H1 is filled with water, which may take in heat from the first generator-absorber unit 45 and supply the heat to the third generator-absorber unit 47.

The pump 13 may cause the water flow to circulate inside the heat recovery circuit H1. The water may be pumped through valve 60, supply heat to the heat exchanger 50 of the third generator-absorber unit 47, flow through valves 34, 42, and take in heat from the heat exchanger 52 of the first generator-absorber unit 45. The water may then flow through the valve 04 and return back to the pump 13, thus completing the heat recovery circuit H1.

The partial pressurization process results in a temperature rise in the third generator-absorber unit 47 and the partial depressurization process results in a temperature drop in the first generator-absorber unit 45. In one embodiment, the temperature in the third generator-absorber unit 47 may rise from 40° C. to 75° C., while the temperature in the first generator-absorber unit 45 may drop from 120° C. to 77° C., assuming a minimum temperature difference of 2° C. for the actual heat recovery process between the first generator-absorber unit 45 and the third generator-absorber unit 47.

In the third stage of operation, the fourth generator-absorber unit 48 may initially go through complete pressurization mode of operation from, which may be followed by the generation mode of operation in the same stage of operation. In one embodiment, the pressure of the fourth generator-absorber unit 48 may increase from 5.7 bar to 15.5 bar. During the complete pressurization mode, the temperature of the strong solution in the fourth generator-absorber unit 48 may rise from 75° C. to 95° C., whereas in the generation mode of operation the aqua-ammonia solution temperature may rise from 95° C. to 120° C., while the ammonia mass concentration of the aqua-ammonia solution may reduce from 0.43 to 0.32

The energy required for both the complete pressurization and the generation modes of operation may be supplied by the solar collector 01. The solar collector circuit S may be connected to the pump 44 by keeping valves 05, 09, 61, 26 of the solar collector circuit S open, while keeping the valves 03, 07, 62, 41, 38, 33 of the solar collector circuit S closed. Water inside the solar collector circuit S may be pumped to the solar collector 01 where it receives solar thermal energy, moved through valve 05, then through valve 09, then through valve 61, and the solar thermal energy may be supplied to the heat exchanger 49 of the fourth generator-absorber unit 48. The water may then be supplied through valve 26 to return back to the pump 44, thus completing the solar collector circuit S.

As a result of solar energy input, the fourth generator-absorber unit 48 may initially undergo complete pressurization in the complete pressurization mode of operation during which the valves 06, 08, 10, 63, 64, 65, 14, 17 of the generation circuit G may be kept closed. Once pressurization in the complete pressurization mode is completed, the fourth generator-absorber unit 48 may enter into the generation mode of operation. During the generation mode, the aqua-ammonia vapors may be generated and the valves 63, 65 may be opened to connect the fourth generator-absorber unit 48 to the dephlegmator 12 where rectification of the generated aqua-ammonia vapors may take place, thereby removing water content from the aqua-ammonia vapors by heat rejection through heat exchanger 11 of the dephlegmator 12. The condensate from the dephlegmator 12 may return back following the same path through the valves 63, 65 to the fourth generator-absorber unit 48.

The valves 14, 17 of the generation circuit G may also be opened to connect the dephlegmator 12 to the condenser 15 and the vapor-liquid heat exchanger unit 57. The rectified ammonia vapors may condense inside the condenser 15. In one embodiment, the rectified ammonia vapors may condense at a temperature of 40° C. and a pressure of 15.5 bar by rejecting heat to the heat exchanger 16 of the condenser 15 and then enter into the vapor-liquid heat exchanger unit 57 where the ammonia is stored and sub-cooled by the heat exchanger 58.

In the third stage of operation, the second generator-absorber unit 46 may initially go through complete depressurization mode of operation, which may be followed by the absorption mode of operation in the same stage of operation. In one embodiment, the pressure of the second generator-absorber unit 46 may decrease from 9.8 bar to 3.5 bar. During the complete depressurization mode, the temperature of the weak solution in the second generator-absorber unit 46 may drop from 77° C. to 61.5° C., whereas in the absorption mode of operation the aqua-ammonia solution temperature may drop from 61.5° C. to 40° C., while the ammonia mass concentration of the aqua-ammonia solution may increase from 0.32 to 0.43.

The energy required to be removed for both the complete depressurization and the absorption modes of operation may be rejected by the heat rejection unit 19. The heat rejection circuit H2 may be connected to the pump 27 by keeping valves 20, 29, 32, 36, 54 of the heat rejection circuit H2 open while keeping the valves 28, 31, 37, 53, 55, 56 of the heat rejection circuit H2 closed. Water inside the heat rejection circuit H2 may be pumped through valve 29, then through valve 32, and then through valve 36 to the heat exchanger 51 of the second generator-absorber unit 46 where the water gains heat that is required to be removed. The water may then move through valve 54 to the heat rejection unit 19 where it rejects heat to the cooling water in the heat exchanger 18, moves through the valve 20 and returns back to the pump 27, thus completing the heat rejection circuit H2.

As a result of heat rejection, the second generator-absorber unit 46 may initially undergo complete depressurization in the complete depressurization mode of operation where the throttling valve 21 and the valves 43, 40, 35, 30, 22 of the generation circuit G may be kept closed. Once depressurization in the depressurization mode is completed, the second generator-absorber unit 46 enters into the absorption mode of operation. During the absorption mode of operation, the throttling valve 21 and valve 22 may be opened, the sub-cooled refrigerant ammonia may be throttled by the throttling valve 21 to be converted into a vapor-liquid mixture which may then enter into the evaporator 24. The heat exchanger 23 inside the evaporator 24 may take in the latent heat of vaporization from the liquid portion of the refrigerant ammonia to provide the required cooling effect. In one embodiment, the cooling effect may be provided at a temperature of −5° C. and a pressure of 3.5 bar.

The saturated ammonia vapor formed due to the evaporation process may move out of the evaporator 24 through valve 22 to enter into the heat exchanger 58 of vapor-liquid heat exchanger unit 57. The saturated vapor may become superheated by gaining the heat while sub-cooling the liquid refrigerant ammonia inside the vapor-liquid heat exchanger unit 57. The superheated ammonia vapor thus produced may move inside the second generator-absorber unit 46 to get absorbed inside the weak aqua-ammonia solution inside it, thereby producing strong aqua-ammonia solution. In order for absorption process to take place inside the second generator-absorber unit 46, the valve 40 may now be kept open while the valves 30, 43, 35 may still be kept closed.

Fourth Stage of Operation

The fourth stage of operation may be a final stage of operation after which one refrigeration cycle of the IOBCAS is completed, a new refrigeration cycle beginning with the first stage of operation may be commenced. In the fourth stage of operation, the second generator-absorber unit 46 may go through the partial pressurization mode of operation where the second generator-absorber unit 46 may increase in pressure. In one embodiment, the pressure of the second generator-absorber unit 46 may increase from 3.5 bar to 5.7 bar. The partial pressurization process of the second generator-absorber unit 46 may take place by heat recovery through the partial depressurization of the fourth generator-absorber unit 48.

During partial depressurization of the fourth generator-absorber unit 48, the fourth generator-absorber unit 48 may decrease in pressure. In one embodiment, the fourth generator-absorber unit 48 may decrease from 15.5 bar to 9.8 bar. Hence, the fourth generator-absorber unit 48 may go through the partial depressurization mode of operation while second generator-absorber unit 46 undergoes the partial pressurization mode of operation. The heat recovery circuit H1 between the second generator-absorber unit 46 and the fourth generator-absorber unit 48 during the fourth stage of operation may be connected to the pump 13 by keeping valves 02, 59, 39, 25 of the heat recovery circuit H1 open, while keeping the valves 04, 60, 42, 34 of the heat recovery circuit H1 closed. The heat recovery circuit H1 may be filled with water, which may take heat from the fourth generator-absorber unit 48 and supply the heat to the second generator-absorber unit 46.

The pump 13 may cause the water flow to circulate inside the heat recovery circuit H1. The water may be pumped through valve 59, take in the heat from the heat exchanger 49 of the fourth generator-absorber unit 48, flow through the valves 25, 39, and supply the heat to the heat exchanger 51 of the second generator-absorber unit 46. The water may then flow through the valve 02 and return back to the pump 13, thus completing the heat recovery circuit H1.

The partial pressurization process results in temperature rise in the second generator-absorber unit 46 and the partial depressurization process results in a temperature drop in the fourth generator-absorber unit 48. In one embodiment, the temperature of the second generator-absorber unit 46 may rise from 40° C. to 75° C., while the temperature of the fourth generator-absorber unit 48 may drop from 120° C. to 77° C., assuming a minimum temperature difference of 2° C. for the actual heat recovery process between the second generator-absorber unit 46 and the fourth generator-absorber unit 48.

In the fourth stage of operation, the third generator-absorber unit 47 may initially go through complete pressurization mode of operation, which may be followed by the generation mode of operation in the same stage of operation. In one embodiment, the pressure of the third generator-absorber unit 47 may increase from 5.7 bar to 15.5 bar. During the complete pressurization mode, the temperature of the strong solution in the third generator-absorber unit 47 may rise from 75° C. to 95° C., whereas in the generation mode of operation the aqua-ammonia solution temperature may rise from 95° C. to 120° C., while the ammonia mass concentration of the aqua-ammonia solution may reduce from 0.43 to 0.32.

The energy required for both the complete pressurization and the generation modes of operation may be supplied by the solar collector 01. The solar collector circuit S may be connected to the pump 44 by keeping valves 05, 09, 62, 33 of the solar collector circuit S open, while keeping the valves 03, 07, 61, 41, 38, 26 of the solar collector circuit S closed. Water inside the solar collector circuit S may be pumped to the solar collector 01 where it receives solar thermal energy, moved through valve 05, then through valve 09, then through valve 62, and the solar thermal energy may be supplied to the heat exchanger 50 of the third generator-absorber unit 47. The water may then be supplied through valve 33 to return back to the pump 44, thus completing the solar collector circuit S.

As a result of solar energy input, the third generator-absorber unit 47 may initially undergo complete pressurization in the complete pressurization mode of operation where the valves 06, 08, 10, 63, 64, 65, 14, 17 of the generation circuit G may be kept closed. Once pressurization in the complete pressurization mode is completed, the third generator-absorber unit 47 may enter into the generation mode of operation. During this mode of operation, the aqua-ammonia vapors may be generated so the valves 64, 65 may be opened to connect the third generator-absorber unit 47 to the dephlegmator 12 where the rectification of the generated aqua-ammonia vapors may take place, thereby removing water content from the aqua-ammonia vapors by heat rejection through heat exchanger 11 of the dephlegmator 12. The condensate from the dephlegmator 12 may return back following the same path through the valves 64, 65 to the third generator-absorber unit 47.

The valves 14, 17 of the generation circuit G may also be opened to connect the dephlegmator 12 to the condenser 15 and the vapor-liquid heat exchanger unit 57. The rectified ammonia vapors may condense inside the condenser 15. In one embodiment, the rectified ammonia vapors may condense at a temperature of 40° C. and a pressure of 15.5 bar by rejecting heat to the heat exchanger 16 of the condenser and then enter into the vapor-liquid heat exchanger unit 57 where the ammonia is stored and sub-cooled by the heat exchanger 58.

In the fourth stage of operation, the first generator-absorber unit 45 may initially go through complete depressurization mode of operation, which may be followed by the absorption mode of operation in the same stage of operation. In one embodiment, the pressure of the first generator-absorber unit 45 may decrease from 9.8 bar to 3.5 bar.

During the complete depressurization mode, the temperature of the weak solution in the first generator-absorber unit 45 may drop from 77° C. to 61.5° C., whereas in the absorption mode of operation the aqua-ammonia solution temperature may drop from 61.5° C. to 40° C. while the ammonia mass concentration of the aqua-ammonia solution increases from 0.32 to 0.43.

The energy required to be removed for both complete depressurization and absorption modes of operation may be rejected by the heat rejection unit 19. The heat rejection circuit H2 may be connected to the pump 27 by keeping valves 20, 29, 32, 37, 53 of the heat rejection circuit H2 open while keeping the valves 28, 31, 36, 54, 55, 56 of the heat rejection circuit H2 closed. Water inside the heat rejection circuit H2 may be pumped through the valves 29, 32, 37 to the heat exchanger 52 of the first generator-absorber unit 45 where the water gains heat that is required to be removed. The water may then move through valve 53 to the heat rejection unit 19 where it rejects heat to the cooling water in the heat exchanger 18, moves through the valve 20 and return back to the pump 27, thus completing the heat rejection circuit H2.

As a result of heat rejection, the first generator-absorber unit 45 may initially undergo complete depressurization in the complete depressurization mode of operation where the throttling valve 21 and the valves 43, 40, 35, 30, 22 of the generation circuit G may be kept closed. Once depressurization in the depressurization mode is completed, the first generator-absorber unit 45 may enter into the absorption mode of operation. During the absorption mode of operation, the throttling valve 21 and valve 22 may be opened, the sub-cooled refrigerant ammonia may be throttled by the throttling valve 21 to be converted into a vapor-liquid mixture which may then enter into the evaporator 24.

During this mode of operation, the sub-cooled refrigerant ammonia is throttled by the throttling valve 21 to be converted into the vapor-liquid mixture which then enters into the evaporator 24. The heat exchanger 23 inside the evaporator 24 may take in the latent heat of vaporization from the liquid portion of the refrigerant ammonia to provide the required cooling effect. In one embodiment, the cooling effect may be provided at a temperature of −5° C. and a pressure of 3.5 bar.

The saturated ammonia vapor formed due to the evaporation process may move out of the evaporator 24 through valve 22 to enter into the heat exchanger 58 of vapor-liquid heat exchanger unit 57. The saturated vapor may become superheated by gaining the heat while sub-cooling the liquid refrigerant ammonia inside the vapor-liquid heat exchanger unit 57. The superheated ammonia vapor thus produced moves inside the first generator-absorber unit 45 to get absorbed by the weak aqua-ammonia solution inside it, thereby producing strong aqua-ammonia solution. In order for absorption process to take place inside the first generator-absorber unit 45, the valve 43 may now be kept open while the valves 35, 40, 30 may still be kept closed.

In one embodiment, each of the four generator-absorber units 45, 46, 47, 48 may be designed to be filled with strong aqua-ammonia solution. In one embodiment, the four generator-absorber units 45, 46, 47, 48 may be filled with 10 kg of strong aqua-ammonia solution. The mass flow rates through the water pumps 13, 44, 27 and the sizes of all of the heat exchanger may be selected such that operation time for all four stages of operation take the same amount of time. In one embodiment, the amount of time for each stage of operation may be fifteen minutes.

Comparing the IOBCAS against conventional intermittent operation systems under the same operating conditions, the conventional intermittent operation system has a coefficient of performance of 0.2929 whereas the IOBCAS of the present disclosure has a coefficient of performance of 0.3949. The IOBCAS has a comparatively high coefficient of performance because of the innovative design of the heat recovery process. The IOBCAS has an advantage in being able to provide refrigeration or cooling effect during the daytime. Also, since the four stages of cycle can be completed in a short period of time, i.e. 15 minutes, the cycle time is comparatively much shorter than a 24-hour period. As a result, the overall mass of the IOBCAS can be effectively reduced for any given specific cooling load.

It is understood that the IOBCAS of the present disclosure is not limited to the particular embodiments disclosed herein, but embraces much modified forms thereof that are within the scope of the following claims.

The invention claimed is:

1. An intermittent operation based continuous absorption system comprising:
a plurality of generator-absorber units, each of the plurality of generator-absorber units including a shell and a heat exchanger disposed within the shell;
a heat recovery circuit including a transfer pump to conduct heat recovery;
a solar collection circuit including a solar collector to collect solar thermal energy;
a heat rejection circuit including a heat rejection unit to reject heat; and
a generation circuit including a vapor-liquid heat exchanger unit and an evaporator to provide refrigeration to a cooling load,
wherein each of the heat exchangers of the plurality of generator-absorber units include an internal passage that is in selective fluid communication with the solar collection circuit, the heat rejection circuit, and the heat recovery circuit, and
wherein each of the shells of the plurality of generator-absorber units is in selective fluid communication with the generation circuit.

2. The absorption system of claim 1, wherein each of the plurality of generator-absorber units include a first inlet valve connected to the solar collection circuit, a second inlet valve connected to the heat rejection circuit, a third inlet valve connected to the heat recovery circuit, and a fourth inlet valve connected to the generation circuit, and
wherein each of the plurality of generator-absorber units include a first outlet valve connected to the solar collection circuit, a second outlet valve connected to the heat rejection circuit, a third outlet valve connected to the heat recovery circuit, and a fourth outlet valve connected to the generation circuit.

3. The absorption system of claim 1, wherein the generation circuit further includes a dephlegmator and a condenser.

4. The absorption system of claim 3, wherein the dephlegmator is disposed upstream of the condenser in the generation circuit.

5. The absorption system of claim 1, wherein the generation circuit further includes a throttling valve, and
wherein the vapor-liquid heat exchanger unit includes a heat exchanger to conduct sub-cooling of refrigerant by heat recovery before the refrigerant is conveyed to the evaporator of the generation circuit via the throttling valve.

6. The absorption system of claim 5, wherein the vapor-liquid heat exchanger unit, the throttling valve, and the evaporator are disposed in sequential order in an upstream to downstream direction of the generation circuit.

7. The absorption system of claim 1, wherein the plurality of generator-absorber units include a first generator-absorber unit, a second generator-absorber unit, a third generator-absorber unit, and a fourth generator-absorber unit.

8. A method of operating the absorption system of claim 7, comprising:
partially pressurizing the first generator-absorber unit and partially depressurizing the third generator-absorber unit, in a first stage of operation, by fluidly connecting the heat exchanger of the first generator-absorber unit to the heat exchanger of the third generator-absorber unit via the heat recovery circuit;
completely pressurizing, in the first stage of operation, the second generator-absorber unit by fluidly connecting the heat exchanger of the second generator-absorber unit to the solar collector via the solar collection circuit;
completely depressurizing, in the first stage of operation, the fourth generator-absorber unit by fluidly connecting the heat exchanger of the fourth generator-absorber unit to the heat rejection unit via the heat rejection circuit; and
throttling refrigerant, in the first stage of operation, through a throttling valve of the generation circuit by fluidly connecting the shell of the fourth generator-absorber unit to the vapor-liquid heat exchanger unit via the generation circuit.

9. The method of operating the absorption system of claim 8, further comprising:
partially pressurizing the fourth generator-absorber unit and partially depressurizing the second generator-absorber unit, in a second stage of operation, by fluidly connecting the heat exchanger of the second generator-absorber unit to the heat exchanger of the fourth generator-absorber unit via the heat recovery circuit;
completely pressurizing, in the second stage of operation, the first generator-absorber unit by fluidly connecting the heat exchanger of the first generator-absorber unit to the solar collector via the solar collection circuit;
completely depressurizing, in the second stage of operation, the third generator-absorber unit by fluidly connecting the heat exchanger of the third generator-absorber unit to the heat rejection unit via the heat rejection circuit; and
throttling refrigerant, in the second stage of operation, through the throttling valve of the generation circuit by fluidly connecting the shell of the third generator-absorber unit to the vapor-liquid heat exchanger unit via the generation circuit.

10. The method of operating the absorption system of claim 9, further comprising:
partially pressurizing the third generator-absorber unit and partially depressurizing the first generator-absorber unit, in a third stage of operation, by fluidly connecting the heat exchanger of the first generator-absorber unit to the heat exchanger of the third generator-absorber unit via the heat recovery circuit;
completely pressurizing, in the third stage of operation, the fourth generator-absorber unit by fluidly connecting the heat exchanger of the fourth generator-absorber unit to the solar collector via the solar collection circuit;
completely depressurizing, in the third stage of operation, the second generator-absorber unit by fluidly connecting the heat exchanger of the second generator-absorber unit to the heat rejection unit via the heat rejection circuit; and
throttling refrigerant, in the third stage of operation, through the throttling valve of the generation circuit by fluidly connecting the shell of the second generator-absorber unit to the vapor-liquid heat exchanger unit via the generation circuit.

11. The method of operating the absorption system of claim 10, further comprising:
partially pressurizing the second generator-absorber unit and partially depressurizing the fourth generator-absorber unit, in a fourth stage of operation, by fluidly connecting the heat exchanger of the second generator-absorber unit to the heat exchanger of the fourth generator-absorber unit via the heat recovery circuit;
completely pressurizing, in the fourth stage of operation, the third generator-absorber unit by fluidly connecting the heat exchanger of the third generator-absorber unit to the solar collector via the solar collection circuit;

completely depressurizing, in the fourth stage of operation, the first generator-absorber unit by fluidly connecting the heat exchanger of the first generator-absorber unit to the heat rejection unit via the heat rejection circuit; and throttling refrigerant, in the fourth stage of operation, through the throttling valve of the generation circuit by fluidly connecting the shell of the first generator-absorber unit to the vapor-liquid heat exchanger unit via the generation circuit.

* * * * *